United States Patent
Yamamoto et al.

[11] Patent Number: 5,313,572
[45] Date of Patent: May 17, 1994

[54] FILING STORAGE AND RETRIEVAL EQUIPMENT AND APPARATUS

[75] Inventors: Susumu Yamamoto; Masahiko Katsurabayashi; Nobuyuki Shigeeda; Tadahiko Ikegaya; Katsuhiko Orita, all of Saitama, Japan

[73] Assignee: Fuji Xerox Co., Ltd., Tokyo, Japan

[21] Appl. No.: 596,288

[22] Filed: Oct. 12, 1990

[30] Foreign Application Priority Data

Dec. 26, 1989 [JP] Japan ................ 1-335182
Jul. 13, 1990 [JP] Japan ................ 2-185585

[51] Int. Cl.$^5$ ................................ G06F 15/62
[52] U.S. Cl. ................................ 395/145; 395/600; 382/47
[58] Field of Search ............ 382/47, 44, 48, 56, 382/61; 395/150, 151, 112, 145, 600

[56] References Cited

U.S. PATENT DOCUMENTS

| | | | |
|---|---|---|---|
| 4,555,802 | 11/1985 | Fedak et al. | 382/56 |
| 4,594,674 | 6/1986 | Boulia et al. | 364/523 |
| 4,675,830 | 6/1987 | Hawkins | 364/518 |
| 4,677,571 | 6/1987 | Riseman et al. | 364/519 |
| 4,821,336 | 4/1989 | Roye | 382/56 |
| 4,833,625 | 5/1989 | Fisher et al. | 364/518 |
| 5,038,392 | 8/1991 | Morris et al. | 382/61 |

Primary Examiner—Gary V. Harkcom
Assistant Examiner—Joseph Feild
Attorney, Agent, or Firm—Finnegan, Henderson, Farabow, Garrett & Dunner

[57] ABSTRACT

A filing system scans original documents and converts the information on the documents into picture information which is then condensed and stored in a file storage block. If an index for the files is specified, an index of the picture information is stored in a file image memory having a plurality of fixed memory areas. Coordinates of an area of the original document enclosing the picture information on the original document can be specified, and tables in memory indicate the correspondence between specified areas, the corresponding fixed memory areas in the file image memory, and the addresses of the corresponding stored files. To retrieve the files, an operator can either press certain areas on a document with a stylus pen, provide an identifier of the files, or place marks on an index document prepared by the filing system.

6 Claims, 11 Drawing Sheets

| (INO) | A X (Xa) | A Y (Ya) | B X (Xb) | B Y (Yb) |
|---|---|---|---|---|
| INO (1) | Xa (1) | Ya (1) | Xb (1) | Yb (1) |
| INO (2) | Xa (2) | Ya (2) | Xb (2) | Yb (2) |
| ⋮ | ⋮ | ⋮ | ⋮ | ⋮ |
| INO (n) | Xa (n) | Ya (n) | Xb (n) | Yb (n) |

| INDEX NO. (INO) | COLUMN (P) |
|---|---|
| INO (1) | P (1) |
| INO (2) | P (2) |
| ⋮ | ⋮ |
| INO (n) | P (n) |

| 600 | 610 | 620 | 630 |
|---|---|---|---|
| | 1 | (0.10) (10.20) | A1 |
| | 1 | (0.30) (10.40) | A2 |
| | 1 | (0.50) (10.60) | A3 |
| | ⋮ | ⋮ | ⋮ |

FILING STORAGE AND RETRIEVAL EQUIPMENT AND APPARATUS

BACKGROUND OF THE INVENTION

1. Field of the Invention

The present invention relates generally to storage and retrieval of files, and more particularly to the storage and retrieval of indexed files corresponding to documents.

2. Discussion of the Related Art

Conventional document filing systems include some sort of memory for storing documents which have been scanned, as well as some capability to retrieve the files from memory. A technique for file storage disclosed in Japanese Patent Laid Open No. 294587-1986 compiles a file by first condensing picture image information from a document before storage into memory in order to reduce the amount of memory necessary for storing the document. The file may be later retrieved by providing identifying information via a keyboard and using the retrieved information to display the corresponding picture image on a CRT.

Retrieving a file by providing identifying information via a keyboard makes it difficult to associate the desired picture images with the identifying information accurately. This in turn delays the presentation of the desired display on the CRT. An additional disadvantage of this technique is the complicated operations which are required to retrieve files, and the large size of the equipment necessary to accommodate a CRT display unit.

Another technique for file retrieval is disclosed in the Japanese Patent Laid Open No. 61864-1989. This technique uses a system with an input-output panel having a liquid crystal display portion combined with an input tablet. Reduced-scale picture images corresponding to the individual files are displayed on the liquid crystal display portion, and files are retrieved by selecting a desired reduced-scale picture image with some type of pen.

This second technique is expensive, however, because the input-output panel must be specially constructed by superposition of a liquid crystal display portion onto an input tablet. This technique can be even more expensive if the input-output panel is enlarged because the liquid crystal display portion would occupy a larger area.

Alternative techniques for storing and retrieving files are disclosed in the Japanese laid open Patent No. 264379-1987 and No. 76560-1988.

SUMMARY OF THE INVENTION

The present invention has been made in view of these circumstances and has as an object a filing system which eliminates the problems and disadvantages of the conventional techniques so that file storage and retrieval can be performed easily and simply.

Another object is a system which may also be used either with or without a coordinate input device, such as an editing pad, for editing picture image information. The coordinate input device would be provided on image processing equipment, such as a facsimile machine, Yet another object of the present invention is a method of retrieving files with picture or other information which permits retrieval of a file easily and simply even without using a display unit.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a filing system for storing and allowing access to information from original documents according to the present invention comprises reading means for converting information on an original document into picture information in a format for storage, compression means coupled to the reading means for compressing the picture information, a file storage block coupled to the compression means for storing the compressed picture information into files, indicating device means for specifying an index into the file stored in the file storage block, file image memory means coupled to the file storage block and having a plurality of fixed memory areas for storing into the fixed memory areas the picture information specified by instructions from the index file, recording means coupled to the file storage block and the file image memory means for outputting the picture information from the files and the file storage block and the picture information stored in the file image memory means, coordinate input means for indicating coordinates of an area of the original document enclosing the information on the original document, and storage means having tables indicating the correspondence between the area of the coordinate input means and the fixed memory means in the file image means and the correspondence between the fixed memory areas and the file stored in the file storage block.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention.

In the drawings.

DETAILED DESCRIPTION OF THE PREFERRED EMBODIMENTS

Reference will now be made in detail to preferred embodiments of the present invention with reference to the accompanying drawings in which like reference characters designate like or corresponding parts throughout the drawings.

Figure 1:
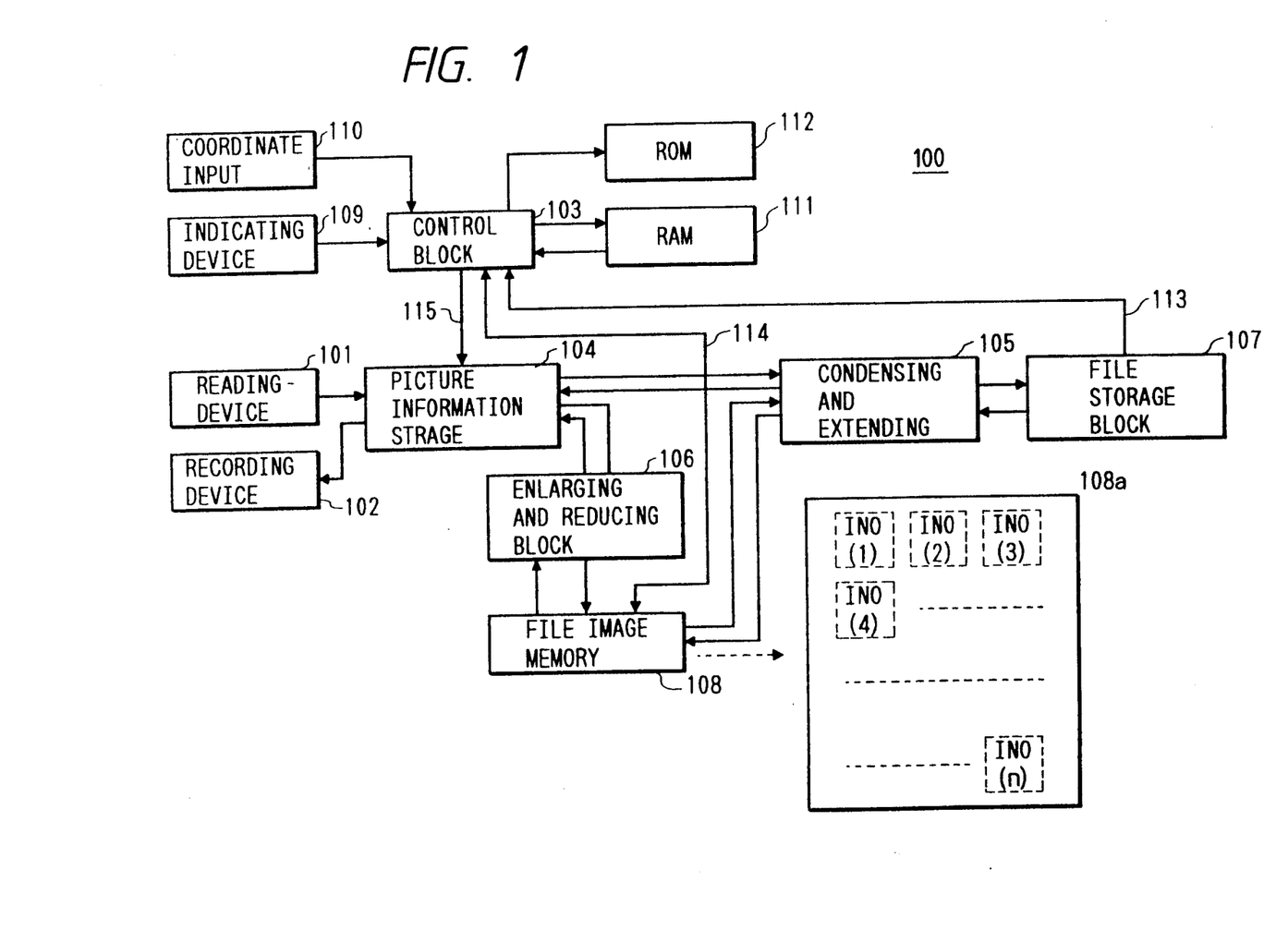
FIG. 1 is a functional block diagram of a preferred embodiment of the present invention.
Figure 2:
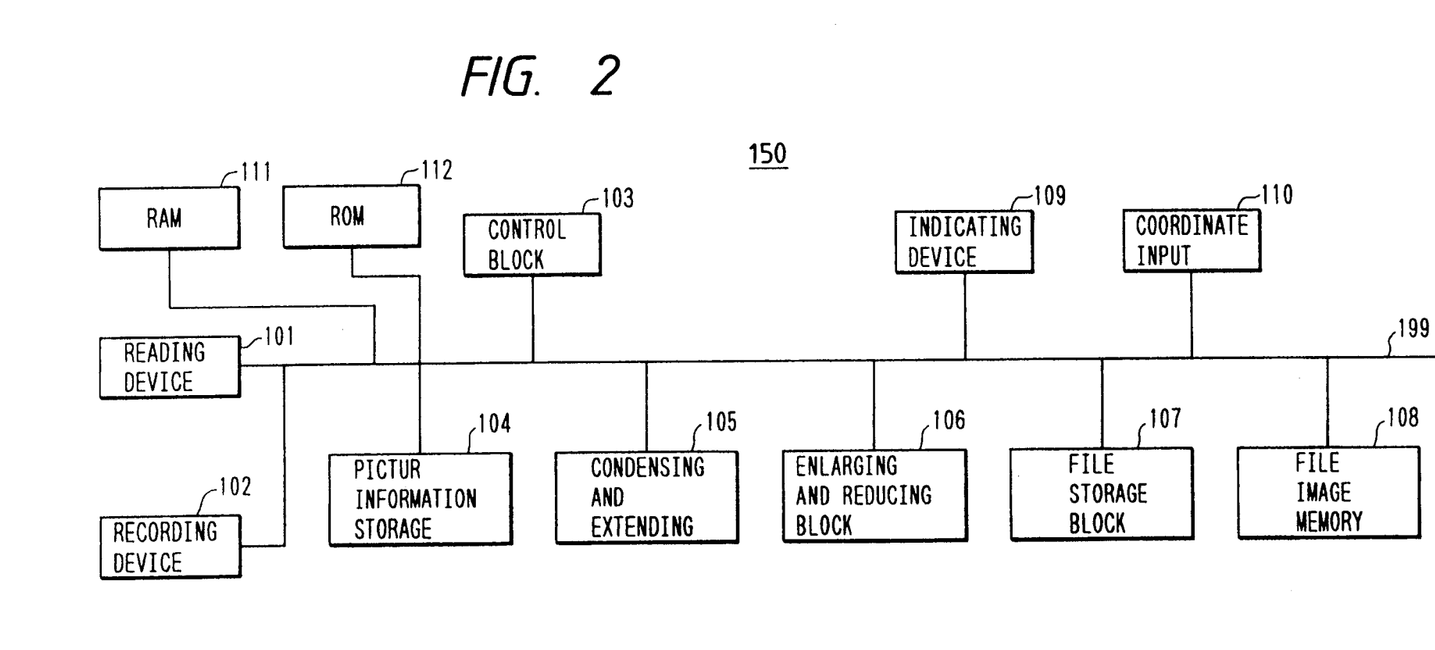
FIG. 2 is a schematic block diagram of the preferred embodiment of the present invention shown in FIG. 1.

FIG. 1 is a functional block diagram 100 of a preferred embodiment of a file system according to this invention. FIG. 2 is a block diagram illustrating the preferred hardware construction of system 150.

In system 150, a picture image reading device 101 reads the optical picture image information furnished in a document reading device such as an electronic copying machine or a facsimile machine, and converts that optical information into electrical signals. Recording device 102 outputs picture images in hard copy form. Control block 103, which can be a central processing unit (CPU) and associated circuitry controls the other elements in FIGS. 1 and 2.

A picture information storage block 104 stores the picture image information read by picture image reading device 101 and stores that picture image information prior to its output to the recording device 102. A compression and expansion block 105 compresses the picture image information, such as by use of an MR process or MMR process, and later expands the compressed picture image information. An enlarging and reducing block 106 changes the size of the picture image represented by the stored information.

A file storage block 107 stores files formed by the condensed picture image information, and a file image memory device 108 stores an index file in the form of image data. These files are described in greater detail below. File storage block 107 and file image memory device 108 may be provided either by dividing a single storage device into respective areas of memory, or by using separate memory devices.

System 150 also includes an indicating device 109 in a panel as well as a coordinate input device 110. The details of coordinate input device 110 are presented in U.S. patent application Ser. No. 07/587,048 which has been abandoned, in view of file wrapper continuation Ser. No. 07/895,448, pending, and in view of continuation-in-part Ser. No. 07/700,610, pending, which is herein incorporated by reference.

The remaining devices in system 150 are a random access memory (RAM) 111 and a read only memory (ROM) 112. RAM 111 stores various data elements, and ROM 112 stores various types of programs.

The individual component elements mentioned above are connected with one another by bus system 199 and operate according to control block 103.

As explained above, FIG. 1 is a functional block diagram of system 100. The common components in both FIG. 1 and FIG. 2 are indicated by the same reference characters. Although the control block 103 controls the operations of virtually all the components in system 100 by transmitting control signals to them, many of those control signals are not related to the present invention and are therefore omitted from FIG. 1.

Figure 3A:
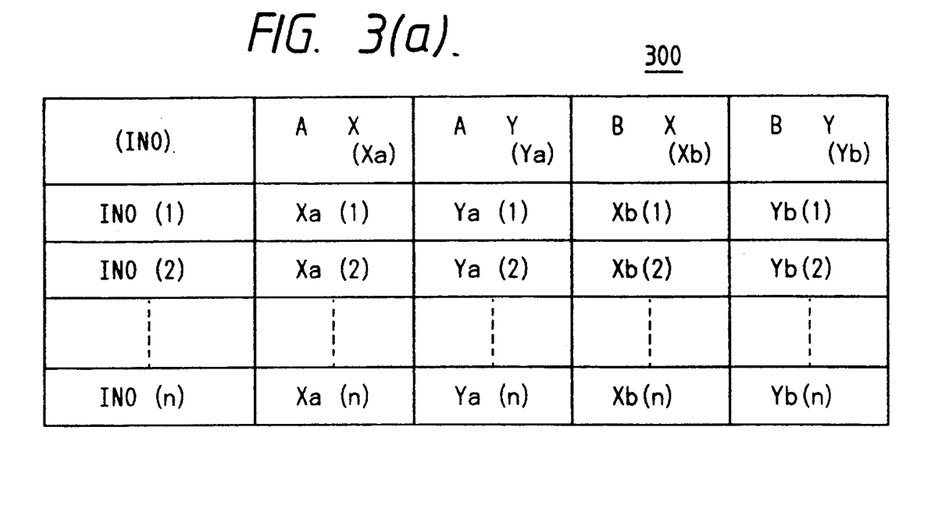
FIG. 3(a) is a table indicating the correspondence between index numbers and coordinates of a picture image.

RAM 111 is a nonvolatile memory device with battery backup and is used to store various types of information. FIG. 3(a) contains a table 300 stored in RAM 111 indicating the correspondence between index numbers and coordinates, and FIG. 3(b) contains a table 350 indicating the correspondence between index numbers and addresses.

Index numbers are used to keep track of different files. Coordinates are set by the coordinate input device 110 to be the x and y coordinates for points A and B (FIG. 3(c)) which are corners of a rectangular area containing the picture information stored in file storage block 107. Table 300 thus indicates the correspondence between the index numbers and the rectangular areas from coordinate input device 110 used to define the extent of the picture image.

Figure 3B:
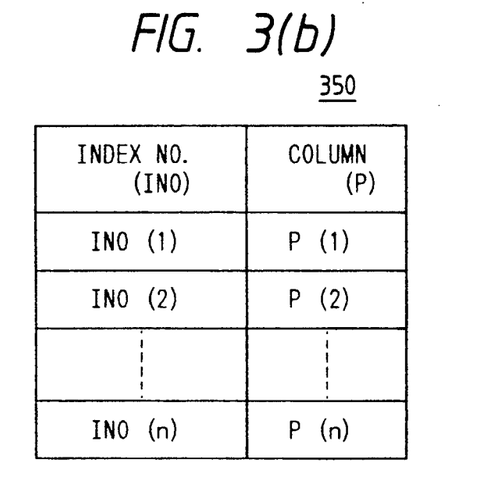
FIG. 3(b) is a table indicating the correspondence between index numbers and internal addresses of the preferred embodiment in FIGS. 1 and 2.
Figure 3C:
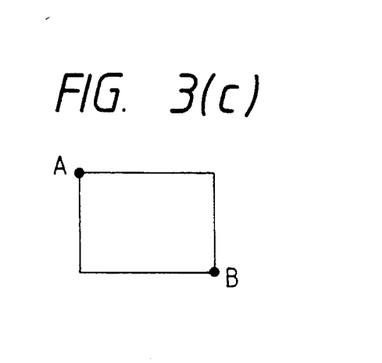
FIG. 3(c) is a diagram explaining the coordinates contained in the table shown in FIG. 3(a)

Table 350 indicates the correspondence between the index numbers of table 300 and the addresses for the corresponding picture information in the file storage block 107. The addresses are registered as the filing operations proceed.

By use of table 300 for indicating the correspondence between the index numbers and the coordinates and table 350 for indicating the correspondence between the index numbers and the addresses, a rectangular area on the coordinate input device 110 can be set to correspond with the addresses in the file storage block 107.

If a large amount of picture information is needed for the index, table 300 will be controlled page by page by a number (n-pieces) of fixed memory areas in file image memory device 108 identified by the index numbers. This can be seen in FIG. 1 by the reference 108a.

Control block 103 can access a given fixed memory area by the index number. When the picture information corresponding to an index number is transmitted to file image memory device 108, the picture information will be stored in one fixed memory area. When the picture information for the next index number is transmitted, this picture information will be stored in a fixed memory area with the next index number.

The index information stored in the file image memory device 108 can be condensed by the compression and expansion block 105 before being transmitted to the file storage block 107. Thereafter, new index picture information can be stored in file image memory device 108. In this manner, index picture information for several pages can be produced.

Figure 4A:
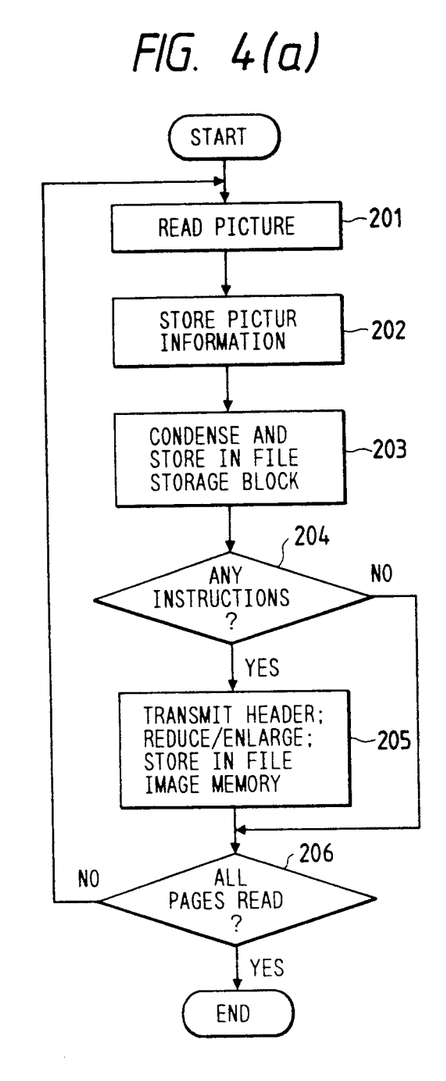
FIG. 4(a) is a flow chart illustrating the operations for filing picture information using the embodiment of the invention in FIGS. 1 and 2.

FIG. 4(a) presents a flow chart for illustrating the filing operations for system 100. First, picture image reading equipment 101 reads the picture information for one page (Step 201), and the picture information is stored into picture information storage block 104 (Step 202). Next, the picture information is condensed in compression and expansion block 105, and stored by control block (Step 203) at the prescribed address specified in file storage block 107. This prescribed address is transmitted to RAM 111 where it is registered in the address column on table 350.

Subsequently, control block 103 determines whether any instructions indicating an index file have been input from the indicating device 109 (Step 204). If so, control block 103 transmits a header for the picture information from the picture information storage block 104 to the enlarging and reducing block 106, where the scale of the picture information is either reduced or enlarged. The processed picture information is stored in a specified fixed memory area in the file image memory device 108 (Step 205).

As the result of this operation, an index file is formed in the file image memory device 108. The entire picture information, instead of only a portion, may be transmitted to enlarging and reducing block 106. If the particular picture information is that of a picture or a graphic figure, the entire picture information should be reduced to form a reduced picture information in the index file.

Control block 103 next determines whether the picture information on all the pages has been read. If not, the picture information on the next page is read (Step 201). If the picture information on all the pages has been read, control block 103 finishes the series of processing operations.

Figure 5:
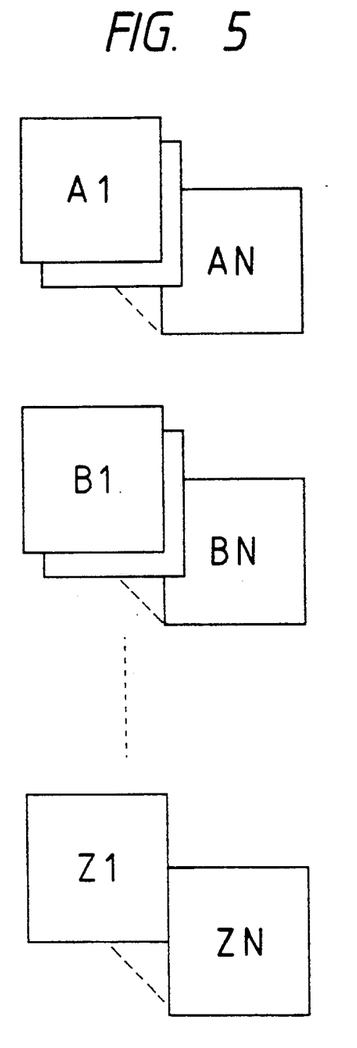
FIG. 5 is an illustration of the picture information which can be read in using the operations shown in FIG. 4(a); picture information in FIG. 5.

These operations can be understood with reference to FIG. 5. FIG. 5 contains picture information A1 through AN, B1 through BN, . . . , Z1 through ZN. The picture information A1 through ZN are read page by page by the operations in Steps 201 through 203 in FIG. 4(a), and the information thus read is condensed by condensing and extending block 105 and stored at a prescribed address in the file storage block 107. The information for compiling an index file at (Step 204) for picture information A1 through ZN is transmitted to the enlarging and reducing block 106. Enlarging and reducing block 106 reduces the picture information, which is then stored in a prescribed area in the file image memory device 108.

Figure 6A:
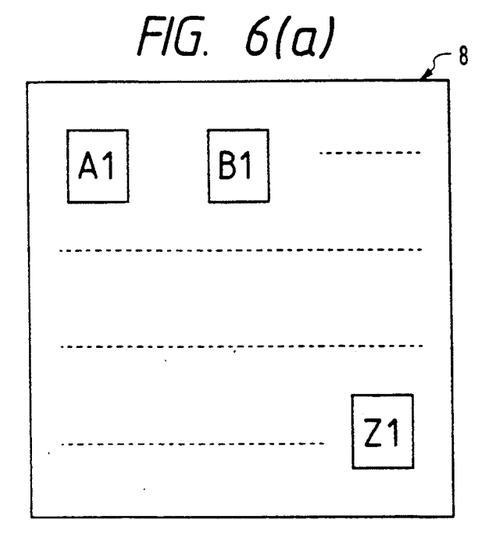

For example, if instructions for compiling an index file are given for picture information A1, B1, . . . , and Z1 at Step 204, an index file containing the headers of the picture information thus specified is made in the file image memory device 108. This is shown in FIG. 6(a).

At this time, the addresses for the headers and the addresses for those subsequent pages not specified for the compilation of any index file are stored in the address column on the table 350. For example, when an index file like the one shown in FIG. 6(a) has been made, the address for picture information A1, which is specified for compiling a corresponding index file, and the addresses for picture information A2 through AN, which are not specified for compiling any index file, are stored in table 350 (FIG. 3(b)).

Figure 6B:
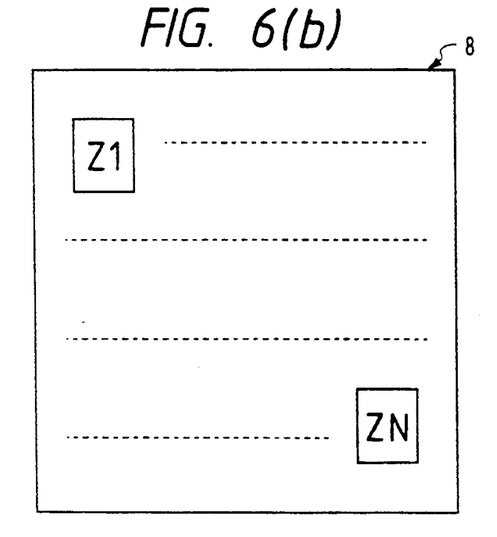

Also, when instructions for compiling an index file are given for only the picture information Z1 through ZN, but instructions are not given for picture information A1 through AN, B1 through BN, . . . , an index file containing the headers for all the pages of the picture information Z can be made as shown in FIG. 6(b).

Figure 4B:
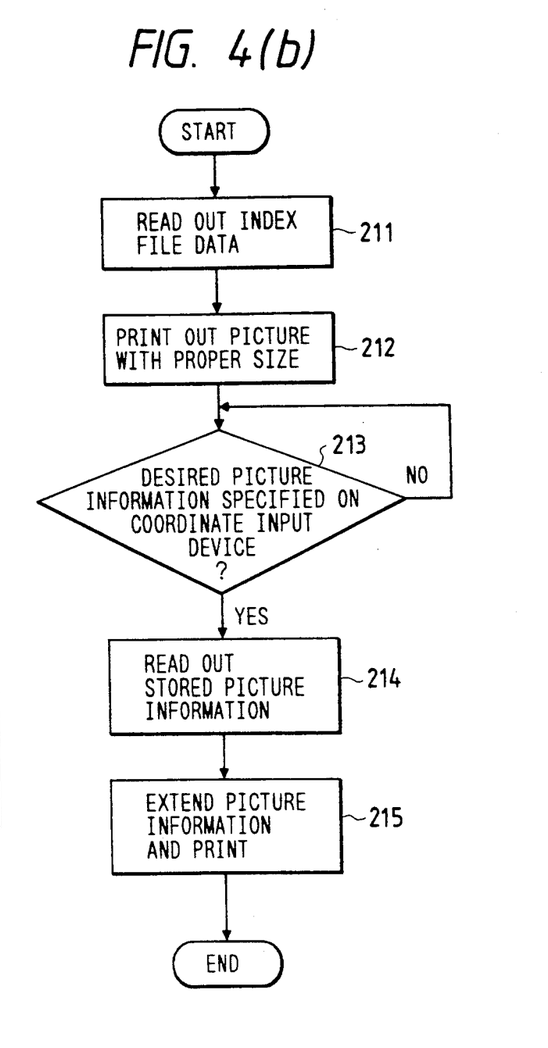
FIG. 4(b) is a flow chart illustrating the operations for retrieving files using the embodiment of the invention if FIGS. 1 and 2.

Next, the operations for the retrieval of a file are described with reference to FIG. 4(b). First, a series of data on an index file are read out of the file storage block 107 and the file image memory device 108 (Step 211). This series of data are enlarged or reduced in the enlarging and reducing block 106 in such a manner that the data will have the same size as the coordinate input area specified on the coordinate input device 110, and the data are then printed out on a hard copy from the recording device 2 (Step 212). If the series of data in the index file is large, several pages of index sheets are output. Thus, data equivalent to the data shown in FIG. 6(a) and FIG. 6(b) are indicated on this printed sheet.

Next, this sheet is placed on the proper coordinate input area on the coordinate input device 110, and the operator specifies the page number of the desired sheet and the desired picture information. The operator preferably gives these instructions by pressing, such as with a stylus pen on the coordinate input device 110, a proper point within an area of the sheet showing a page input area for the page and the desired picture information.

When the operator specifies the desired picture information on the coordinate input area (causing an affirmative answer in Step 213), the control block 103 finds an index number on the table 300 shown in FIG. 3(a) and stored in the RAM 11, and finds an address in the file storage block 107 using table 350 shown in FIG. 3(b). Subsequently, the picture information stored at this address in the file storage block 107 is read out (Step 214). The picture information read out of file storage block 107 is extended in condensing and expanding block 105 and printed out from recording device 102 (Step 215).

Moreover, if the addresses for the pages subordinate to a header are stored in the address column on the table 350 indicating the correspondence between the index numbers and the addresses as mentioned above, it is possible to print out all the pages subordinate to the header at Step 214.

In this way, the present invention allows ready retrieval of the picture information in a file even without a display unit. Thus, the present invention as embodied in systems 100 and 150, can, without any additional hardware, incorporate file retrieving capabilities into picture image processing equipment, facsimile machines, etc., provided only with a conventional coordinate input device such as an editing pad.

Figure 7:
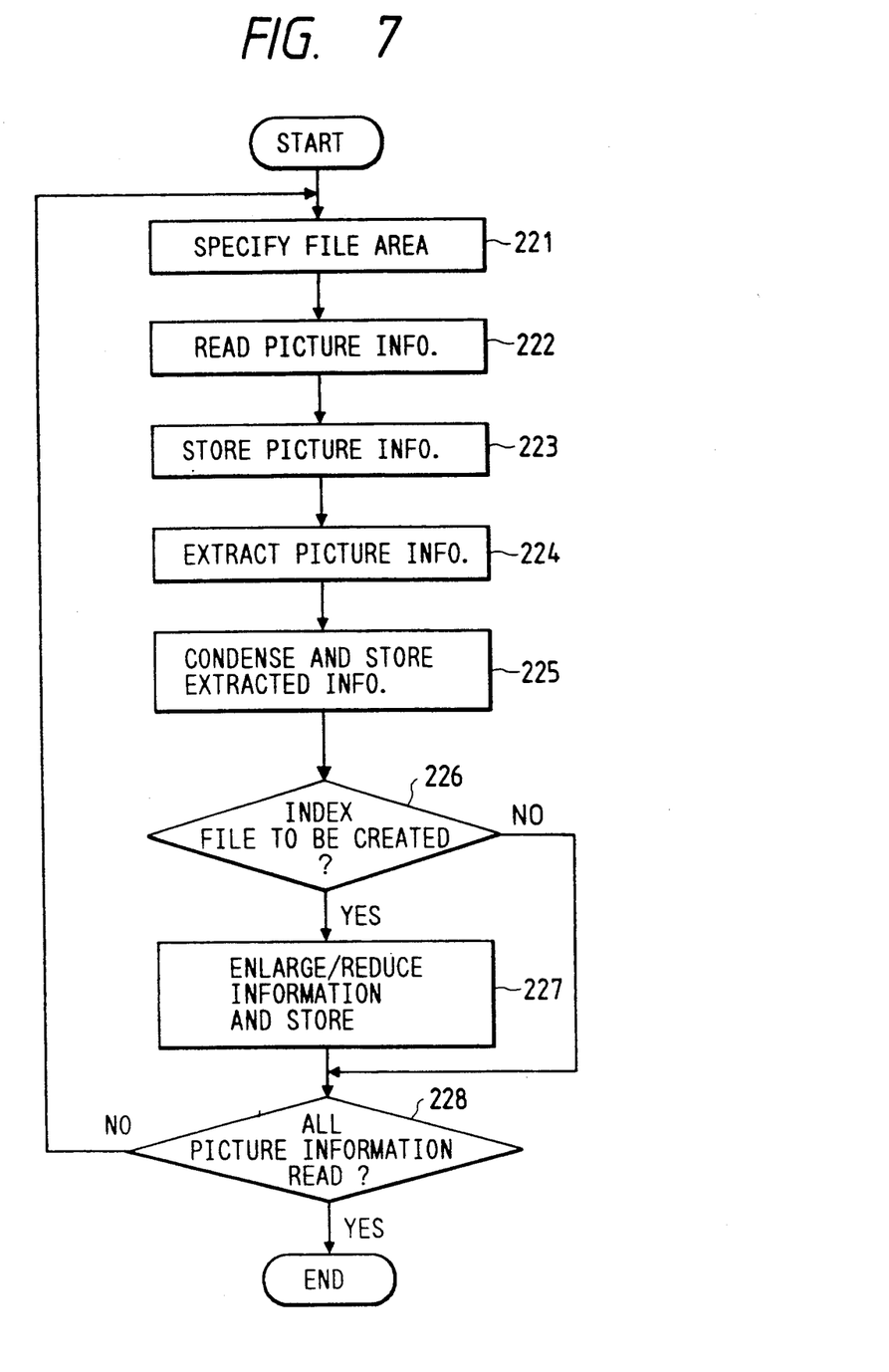
FIG. 7 is a flow chart illustrating the operations performed according to a second preferred embodiment of the present invention.
Figure 8:
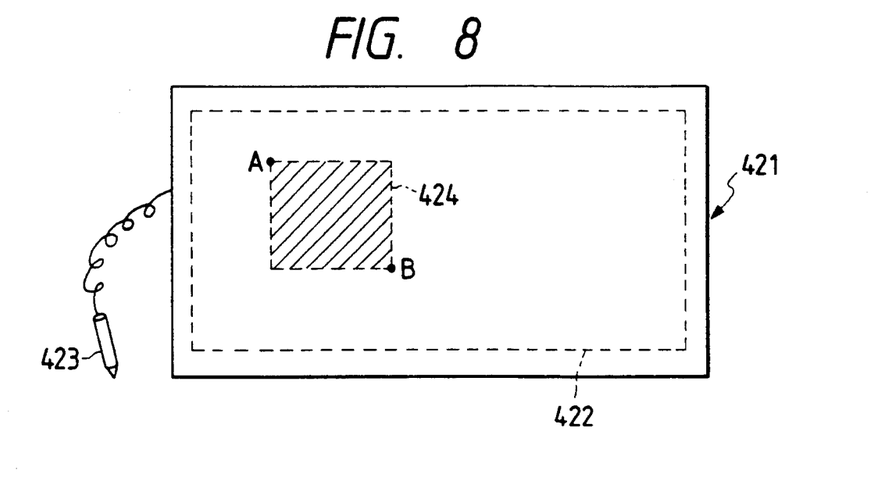
FIG. 8 is an illustration of a file area specified on a document as part of the operations shown in the flow chart in FIG. 7.

Another preferred embodiment of the present invention allows a file to be constructed without all of the picture information read with the picture image reading equipment 101, but only with picture information specified with the coordinate input device 110. FIG. 7 is a flow chart illustrating the operations of this example. FIG. 8 shows a document 422 on accordance input area 421 of coordinate input device 110.

First, a file area is specified by using coordinate input device 110 (Step 221). Specifically, the operator places the original document 422 (FIG. 8), which contains picture information, on coordinate input area 421 and presses down a stylus pen 23 at point A and point B. The area 424 enclosed by these two points forms the file area.

Next, the picture image reading equipment 101 reads the picture information from original document 422

(Step 222). The picture information thus read is stored in the picture information storage block 104 (Step 223).

Subsequently, an operation picture information for the file area specified at Step 221 is extracted from the picture information storage block 104 (Step 224). For the example shown in FIG. 8, an operation is performed for extracting the picture information in the area defined by the two points A and B.

The picture information thus extracted is condensed by compression and expansion block 105 in the same manner as in FIG. 4(a), and is stored at a prescribed address in the file storage block 107 (Step 225).

Control block 103 next determines whether indicating device 109 has given any instructions to create an index file (Step 226). If so, the extracted picture information is transmitted from the picture information storage block 104 to enlarging and reducing block 106 and is then stored in the file image memory device 108 (Step 227). This continues until all the picture information is read (Step 228).

Figure 9:
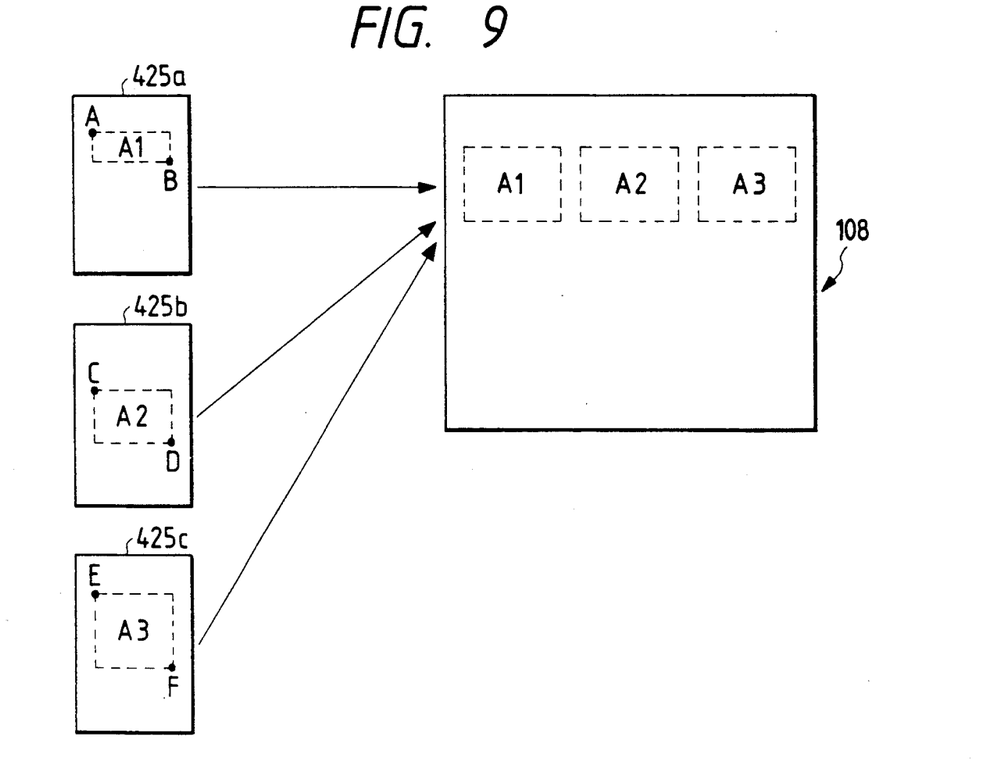
FIG. 9 is an illustration of the storage of different areas of original documents.

Another example is demonstrated by the FIG. 9, which shows three pages of original document 425a, 425b, and 425c and three areas defined by the pairs of points A and B, C and D, and E and F, respectively, which specify the file areas at Step 221. Then, the index files A1, A2, and A3 are created as illustrated in FIG. 9.

In this example, the sizes of the file areas cut out of the original document 425a, 425b, and 425c are quite different. If enlarging and reducing block 106 has only a fixed rate of enlargement or reduction, the amount of data in the picture information in the file area cut out will not agree with the capacity of a fixed memory area in file image memory device 108. In this case, the picture information will not be contained properly in one fixed memory area in the file image memory device 108. Therefore, it is preferred that enlarging and reducing block 106 have the ability for automatic enlargement or automatic reduction.

Now, the operations for automatic reduction by the enlarging and reducing block 106 will be described with reference to FIG. 12. First, it is assumed that one fixed memory area in the file image memory device 108 is rectangular, its length in the X direction being X0 and its length in the Y direction being Y0.

With respect of the file area cut out of the original document information, the coordinates at the point A are read in as (X1, Y1) (Step 531) and the coordinates at point B are read in as (X2, Y2) (Step 532).

Control block 103 first determines whether the condition, $X0/|X2-X1|<1$, is fulfilled (Step 533). If so, control block 103 sets the reduction ratio in the direction X is set at XR which equals $X0/|X2-X1|$ (Step 534). If not, the reduction ratio in the direction X, XR, is set equal to 1 (Step 535).

Next, control block 103 determines whether the condition, $Y0/|Y2-Y1|<1$, is fulfilled (Step 536). If so, control block 103 sets the reduction ratio in the direction Y, YR, equal to $Y0/|Y2-Y1|$ (Step 537). Otherwise, control block 103 sets the reduction ratio in the direction Y, YR, equal to 1 (Step 538).

When the reduction ratios in the X and Y directions are determined in this manner, the file area cut out from the original document information is reduced in these reductions ratios and is then stored in a prescribed fixed memory area in the file image memory device 108.

As the result of this reduction, the data can be contained in the fixed memory area without overflowing even if the amount of the data in the file area thus cut out of the original document information is larger than the capacity of the fixed memory area.

By the same token, if the amount of the data in the file area thus cut out of the original document information is smaller than the capacity of the fixed memory area, it is feasible to enlarge the data automatically so that the amount of the data will be equal to the capacity of the fixed memory area. Such a process as is readily inferable to any person skilled in the art on the basis of FIG. 12.

In another preferred embodiment of this invention, the numbers and names, which are called "identifiers," are assigned to an index file to enable retrieval of desired picture information by inputting the identifiers. For this embodiment, a font ROM is added to the system 150 shown in FIG. 2.

Figure 10:
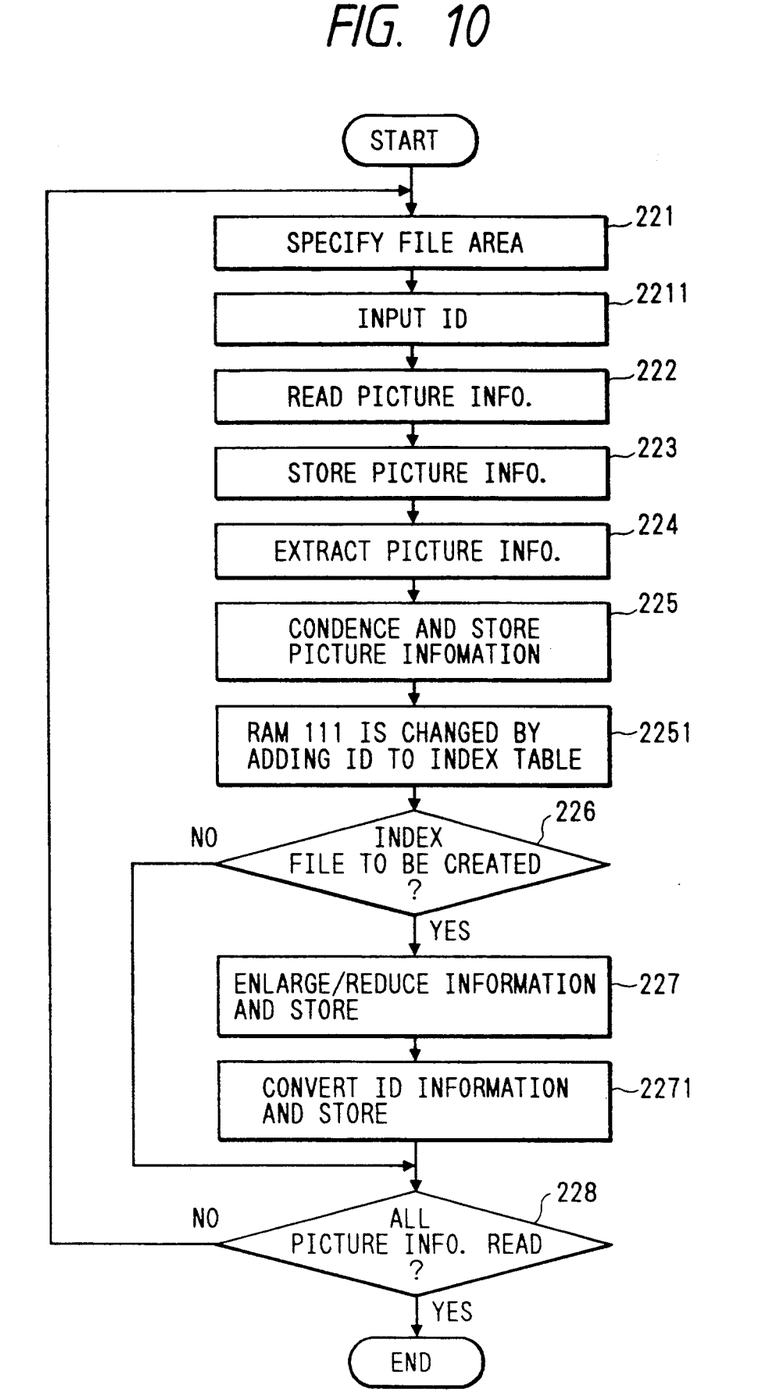
FIG. 10 is a flow chart for illustrating the operations performed according to a preferred embodiment of the present invention.

FIG. 10 includes a flow chart showing the operations performed with the functions of this embodiment applied to the second example described above. In FIG. 10, the same or equivalent processing steps as those in FIG. 7 are marked by the same step numbers.

First, with the original document information placed on coordinate input device 110, the file area is specified in the same manner as described above (Step 221). Next, an identifier is input using the ten numerical keys or the character keys on indicating device 109 (Step 2211).

Thereafter, the operator sets the original document information on the picture image reading equipment 101 which reads the information (Step 222). Next, the processing operations at Steps 223, 224, and 225, which are identical to the operations with the same reference number as in FIG. 7, are performed. At the Step 2251, identifier input at Step 2211 is added to table 350 (FIG. 3(b)) in RAM 111. The identifier is added so that it correlates with the address set up at the Step 225.

Subsequently, Steps 226 and 227, which are the same as the steps with the same reference numbers in FIG. 7, are completed. The identifier is converted into image information in the font ROM and is stored as indicated in with the index file in file image memory device 108 (Step 2271).

Figures 11, 12:
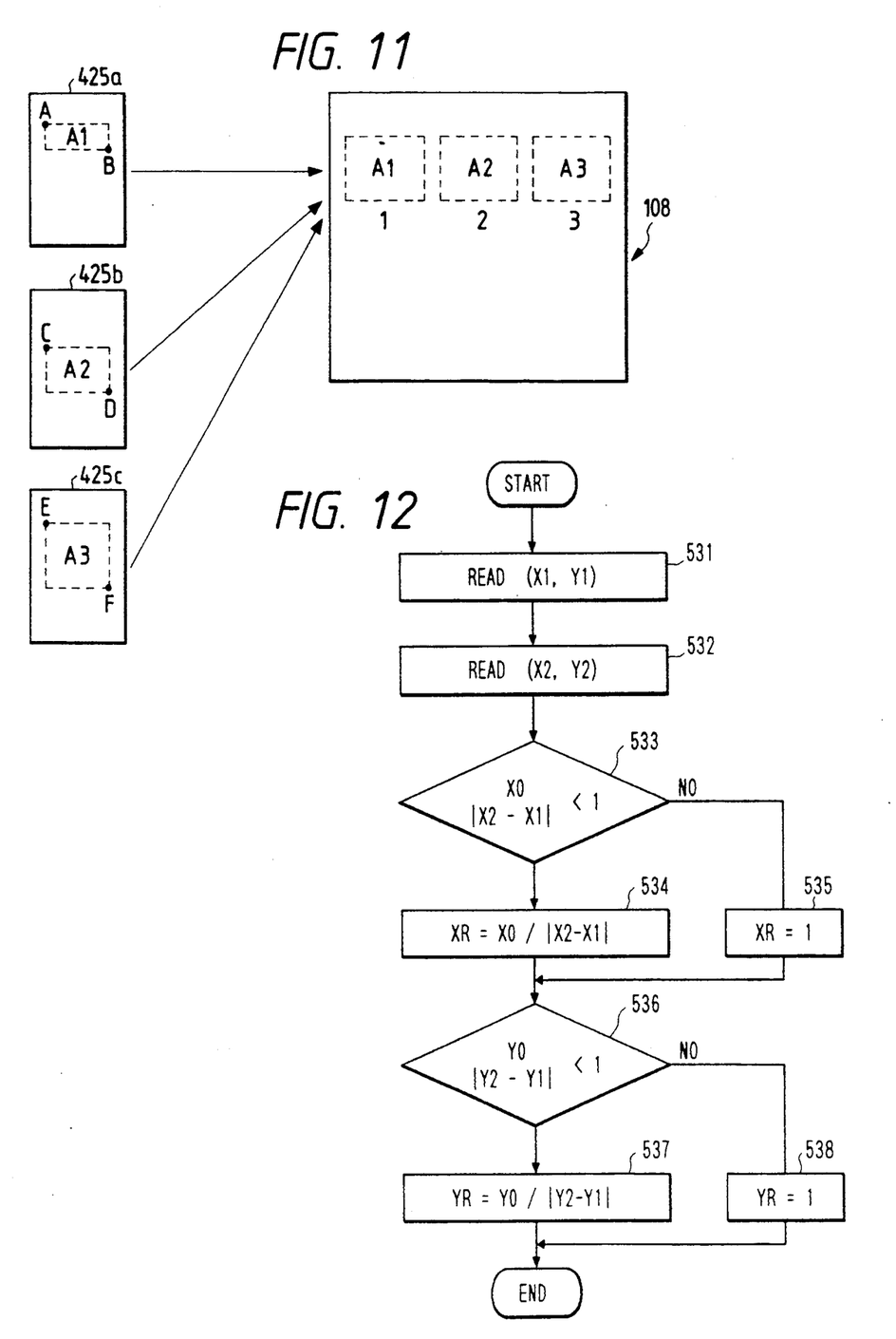
FIG. 11 is an illustration of the storage of picture information in accordance with a third embodiment of the invention.
FIG. 12 is a flow chart illustrating automatic scale reduction used in a preferred embodiment of this invention.

As the result of these processing steps, data with the attached numbers, such as 1, 2, and 3 in FIG. 11, are stored in the index files, such as A1, A2, and A3 in FIG. 11, in the file image memory device 108. In this respect, the reference characters shown in FIG. 11 are the same as those used in FIG. 9, and the representation shown in the FIG. 11 is the same as that of FIG. 9. Therefore, a detailed description of FIG. 11 is not needed.

Upon the completion of Step 2271, the completion determining operation is performed at Step 228. If the reading of all information is not complete, control returns to Step 221, and the operations in the flow chart at FIG. 10 is repeated. On the other hand, if the reading has been completed, the series of processing operations in the flow chart in FIG. 10 is finished.

For retrieving a file after a filing job is completed in the way described above, all the data in the file image memory device 108 are printed out from the recording device 102 in the form of a hard copy in the same size as the coordinate input plane 121 of the coordinate input device 110 (See FIG. 8) in the same way as in the first embodiment.

The hard copy of the images of the index files A1, A2, and A3 include the numbers 1, 2, and 3, respectively. This allows the to select the desired picture information by the input of an appropriate one of these numbers, using the keys on the indicating device 109.

Moreover, in the same manner as in the first and second embodiments, it is also possible to retrieve the picture information by specifying a desired index file with a stylus pen on the printed out paper placed on the coordinate input plane 21 of the coordinate input device 110.

Figure 13:
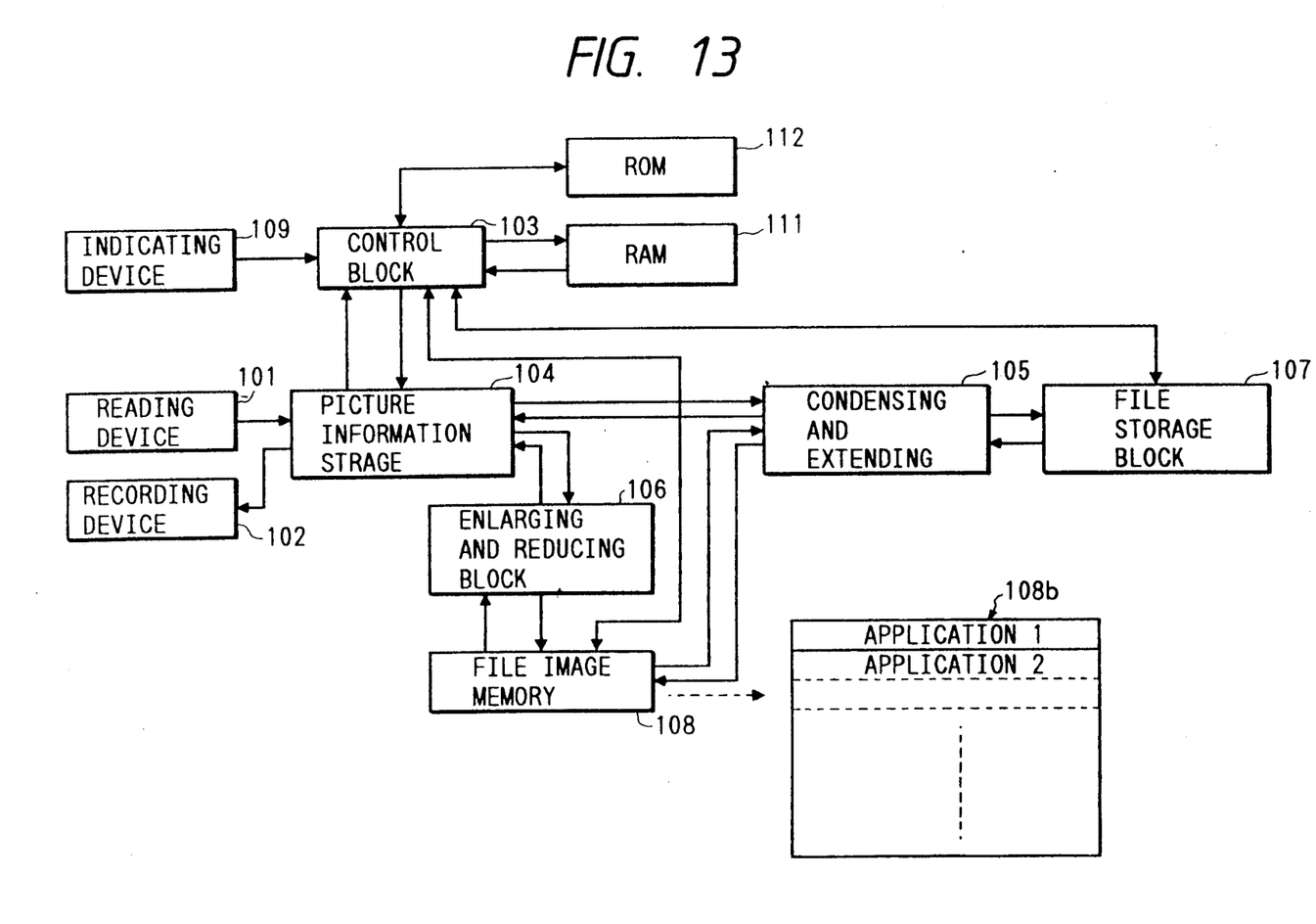
FIG. 13 is a functional block diagram of a fourth embodiment of the present invention.

Next, with reference to the functional block diagram in FIG. 13, a description is given with respect to a fourth embodiment of the present invention. This embodiment affords still greater ease and simplicity in filing and file retrieval without using the coordinate input device 110 (FIG. 1). In FIG. 13, the same reference characters as those in FIG. 1 indicate the same or equivalent items.

Figure 14:
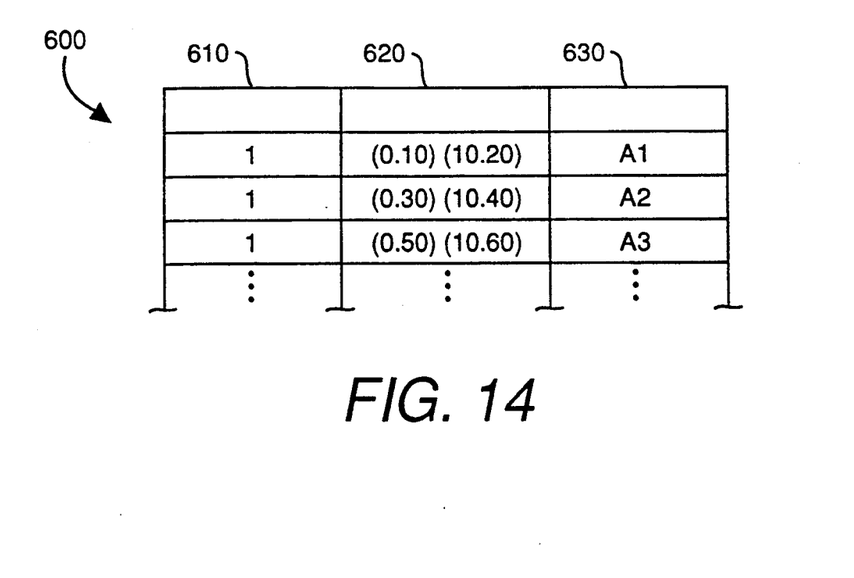
FIG. 14 is an illustration of a table indicating the correspondence between the marking area coordinates and the file storing addresses.

In this embodiment, a table 600 in FIG. 14 indicates the correspondence between the coordinates for the marked areas and the addresses where the files are stored. Columns are provided on table 600 for the registration of page identification codes 610, marked area coordinates 620, and file storage addresses 630. The marked area coordinates 620 indicate the coordinates for the marks entered in a document list which is described below. The locations of the marks are determined in advance and are registered from the beginning. The addresses to be registered in the storage addresses for files will vary, however, depending on the amount of the picture information to be formed into a file. Therefore, the address is to be registered each time a file is compiled.

Figure 15:
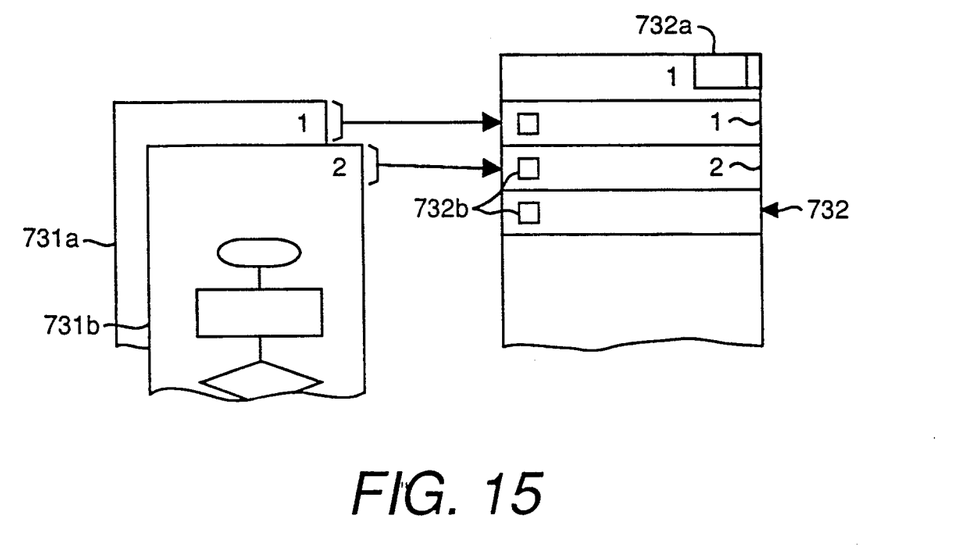
FIG. 15 is a document list prepared with the equipment described in the fourth preferred embodiment shown in FIG. 13.

Next, a description is given of the operations in this embodiment. First, the operations for making files of the original documents 731a and 731b as shown in FIG. 15 are described.

Original document 731a is read with the picture image reading equipment 101 and stored in the picture information storage block 104. Next, the picture information thus stored is read out of the picture information storage block 104, compressed by the condensing and extending block 105, and stored at the prescribed address in the file storage block. This address (A1) is registered in the file storage address column 630 in the table 600 indicating the correspondence between the marked area coordinates and the file storage address, which is provided in the RAM 111.

Next, control block 103 determines whether any instructions have been given for the compilation of an index file. If so, the header part is extracted from picture information storage block 104, enlarged or reduced in the enlarging and reducing block 106, and stored in a fixed memory area in the file image memory device 108.

Subsequent to these operations, a second original document 731b is read with the picture image reading equipment 101, and the same operations are performed for document 731b.

With these operations, the address (A2) is registered in the file storage address column 630 on table 600 indicating the correspondence between the marked area coordinates and the file storage addresses in the RAM 111, and the header of the original document 731b, as enlarged or reduced, is stored in the next fixed memory area in the file image memory device 108.

The reference number 108b in FIG. 13 shows a conceptual view of the file images formed in the file image memory device 108. In this example, contents of the file images 8b are "Application 1 for Patent" in file 810 and "Application 2 for Patent" in file 820, which are parts of the headers of the original documents 731a and 731b.

If such file images do not fit into the file image memory device 108 because there are too many pages in the original document to be read, all the file images are read out and condensed by the condensing and extending block 105 and then stored in the file storage block 107. When this storing operation is completed, the file image memory device 108 updates the page identification code, accepts the new file images, and stores them.

Next, a description is made of the operations for retrieving a file made in this the manner. First, the indicating device 109 gives instructions for the discharge of a document list. When the instructions are thus issued, the file images stored in the file image memory device 108 are read out and, being enlarged or reduced to a prescribed size, the file images are stored in the picture information storage block 104.

The file images thus stored in the picture information storage block 104 are edited according to control block 103 into a document list as shown by the reference number 732 in FIG. 15, and is then discharged from the recording device 2.

If file images have been stored in the file storage block 107, such file images are read out of the file storage block 107 and extended, being then enlarged or reduced to a prescribed size. The data thus processed are thereafter stored in the picture information storage block 104. Then, control block 103 causes the file images to be edited in the manner described above and discharged from the recording device 102.

Document list 732 has a page identification code 732a and a mark entry column 732b, as shown in FIG. 15. The page identification code 732a is output with the number of pages in the document list automatically entered. Page identification code 732a and the mark entry column 732b are placed in their predetermined positions on the document list 732.

The operator puts a mark in the mark entry column, for example by blocking out the mark entry column provided on the document list 732 and corresponding to the file which he desires to retrieve, and then has such a document list read with the picture image reading equipment 101. Control block 103 reads the page identification code on the document list 732, as well as the mark entered in the mark entry column 732b, and refers to table 600 (FIG. 14). With such reference, control block 103 finds the file storage address at which a retrieving operation is to be performed, and then makes access to the address in the file storage block 107.

The picture images of the file read out of the file storage block 107 are extended in the compression and expansion block 105 and stored in the picture information storage block 104. The picture images are then output in a printed form on paper from the recording device 102.

As mentioned above, the equipment described in the fourth embodiment enables the operator to retrieve any desired file by simply putting a mark in the mark entry column on the document list after its discharge and having the document list read by the picture image reading equipment. This equipment, therefore, offers a great deal of convenience to the operator and considerably improves operating efficiency.

Furthermore, the embodiments described above show the equipment as operated with a document list 732 with a mark entry column 732b and by a method of specifying a file to be retrieved by a mark indicated in the said mark entry column 732b. However, the present invention is not limited to this process, but may of course be operated effectively by other similar indicating methods known to persons of ordinary skill in the art.

By storing condensed picture information in a file storage block, the present invention achieves effective use of memory capacity in the file storage block, and can also provide index files from the file image memory device. The present invention can also furnish the data stored in index files such as by printing out the data in hard copies, so that an operator may retrieve a file easily and efficiently by specifying the desired picture information on the hard copy of the data placed on a coordinate input device.

In another sense, the present invention also allows an arbitrarily specified area of picture information to be cut out to form the picture information into a file. This allows ready construction of a file composed only of necessary information.

The present invention also allows assigning an identifier to an index file to retrieve a file based on that identifier as well as by a coordinate input device.

Furthermore, even though an arbitrarily sized area is cut out of the picture information, the picture information in the area formed into an index file can be fit into one fixed memory area in the file image memory device.

The present invention also enables the operator to give instructions for a retrieval of a file with accuracy and ease, thereby improving the operating efficiency. This is because the operator can give direct instructions for retrieving of a file using a sheet of paper with a series of index data printed on it, in contrast to retrieval using a display unit, such as a LCD unit or a cathode ray tube CRT display unit.

The present invention also makes it possible to perform the retrieving operations by specifying the desired data out of a series of the index data printed on a sheet of paper placed on the coordinate input device, thereby making retrieval considerably faster. This feature is even more advantageous for index sheets having several pages.

The foregoing description of preferred embodiments of the invention has been presented for purposes of illustration and description. It is not intended to be exhaustive or to limit the invention to the precise embodiments disclosed. Modifications and variations are possible in light of the above teachings or may be acquired from practice of the invention.

The embodiments disclosed were chosen to explain the principles of the invention and its practical application to enable ones skilled in the art to use the invention. The scope of the invention is intended to be defined by the following claims and their equivalents.

What is claimed is:

1. A filing system for storing and allowing access to information derived from original documents, the filing system comprising:

reading means for converting information on an original document into picture information in a format for storage;

compression means, coupled to the reading means, for compressing the picture information;

a file storage block, coupled to the compression means, for storing compressed picture information into files;

indicating device means for specifying respective index files for preselected files stored in the file storage block;

file image memory means, coupled to the file storage block and having a plurality of assigned memory areas, for storing the picture information in respective assigned memory areas to which said respective index files are specified by said indicating device means;

recording means, coupled to one of the file storage block and the file image memory means, for recording on and printing out a hard copy the picture information from the files in the file storage block and the picture information stored in the file image memory means;

coordinate input means for receiving the hard copy and for generating coordinates of a selected area of the hard copy enclosing desired information on the original document; and storage means having tables indicating correspondence between the area on said coordinate input means and the assigned memory area in the file image memory means and correspondence between said fixed memory means and the files stored in the file storage block.

2. The filing system of claim 1, further comprising automatic scale means for performing automatic scale reduction of the picture information transmitted to the file image memory means defined above.

3. The filing system of claim 1, further comprising: means for specifying a memory file memory area for the picture information; means for transmitting to the file storage block and the file image memory device the picture information in the specified file memory area.

4. The filing system of claim 3, further comprising automatic scale means for performing automatic scale reduction of the picture information transmitted to the file image memory means defined above.

5. The filing system defined in claim 1, further comprising:

means for inputting respective file identifiers for preselected files;

a font ROM, coupled to the inputting means for converting the file identifiers into file image information;

means for transmitting the picture information to the file storage block; and means for transmitting the picture information in a specified memory file area and the file image information to the file image memory means.

6. The filing system of claim 5, further comprising automatic scale means for performing automatic scale reduction of the picture information transmitted to the file image memory means.

* * * * *

UNITED STATES PATENT AND TRADEMARK OFFICE
CERTIFICATE OF CORRECTION

PATENT NO. : 5,313,572
DATED : May 17, 1994
INVENTOR(S) : Susumu Yamamoto et al.

It is certified that error appears in the above-indentified patent and that said Letters Patent is hereby corrected as shown below:

Claim 3, Column 12, Line 36 delete "memory". (first occurrence)

Claim 3, Column 12, Line 38 "device" should read --means--.

Signed and Sealed this

Twenty-first Day of February, 1995

*Attest:*

BRUCE LEHMAN

*Attesting Officer*    *Commissioner of Patents and Trademarks*